United States Patent
Fang et al.

(10) Patent No.: US 12,340,302 B2
(45) Date of Patent: Jun. 24, 2025

(54) METHOD AND SYSTEM FOR MICROARCHITECTURE-AWARE PROGRAM SAMPLING

(71) Applicant: ALIBABA GROUP HOLDING LIMITED, Grand Cayman (KY)

(72) Inventors: Yuanwei Fang, Sunnyvale, CA (US); Minghai Qin, Fremont, CA (US); Yen-kuang Chen, Palo Alto, CA (US)

(73) Assignee: ALIBABA GROUP HOLDING LIMITED, George Town (KY)

(*) Notice: Subject to any disclaimer, the term of this patent is extended or adjusted under 35 U.S.C. 154(b) by 938 days.

(21) Appl. No.: 17/141,895

(22) Filed: Jan. 5, 2021

(65) Prior Publication Data

US 2022/0215241 A1    Jul. 7, 2022

(51) Int. Cl.
*G06N 3/08* (2023.01)

(52) U.S. Cl.
CPC .................... *G06N 3/08* (2013.01)

(58) Field of Classification Search
CPC ........ G06N 3/045; G06N 3/0455; G06N 3/08; G06N 3/0895; G06N 3/09; G06N 3/091; G06N 3/092; G06N 3/094; G06N 3/096; G06N 3/098; G06N 3/0985; G06N 20/00; G06N 20/20; G06N 5/01; G06F 15/78
See application file for complete search history.

(56) References Cited

U.S. PATENT DOCUMENTS

| | | |
|---|---|---|
| 8,104,000 B2 | 1/2012 | Bjesse |
| 8,266,570 B2 | 9/2012 | Walker et al. |
| 8,364,998 B2 | 1/2013 | Hsu et al. |
| 8,863,052 B1 | 10/2014 | Dhuria et al. |

(Continued)

FOREIGN PATENT DOCUMENTS

| | | |
|---|---|---|
| CN | 105740258 A | 7/2016 |
| CN | 107590698 A | 1/2018 |

(Continued)

OTHER PUBLICATIONS

Wan et al., "Multi-modal Attention Network Learning for Semantic Source Code Retrieval," 2019 34th IEEE/ACM International Conference on Automated Software Engineering (ASE), San Diego, CA, USA, 2019, pp. 13-25. https://dl.acm.org/doi/pdf/10.1109/ASE.2019.00012 (Year: 2019).*

(Continued)

*Primary Examiner* — Abdullah Al Kawsar
*Assistant Examiner* — Tewodros E Mengistu
(74) *Attorney, Agent, or Firm* — Sheppard Mullin Richter & Hampton LLP (57) ABSTRACT

This application describes methods, systems, and apparatus, including computer programs encoded on computer storage media, for microarchitecture-aware program sampling. An exemplary method includes receiving one or more traces collected from one or more microarchitectures executing a computer program for evaluating hardware configurations; training a machine learning (ML) model with multi-task learning based on the one or more traces as one or more training tasks; generating a plurality of embedded vectors representing the computer program; and updating, based on the trained ML model, the plurality of embedded vectors.

12 Claims, 6 Drawing Sheets

(56) References Cited

U.S. PATENT DOCUMENTS

| | | | |
|---|---|---|---|
| 9,208,053 | B2 | 12/2015 | Kejariwal et al. |
| 9,300,523 | B2 | 3/2016 | Alone et al. |
| 9,361,102 | B2 | 6/2016 | Tan et al. |
| 9,413,527 | B2 | 8/2016 | Yang et al. |
| 10,459,877 | B2 | 10/2019 | Uliel et al. |
| 10,482,355 | B2 | 11/2019 | Heifets et al. |
| 10,496,643 | B2 | 12/2019 | Kandula et al. |
| 2007/0219646 | A1 | 9/2007 | Oslake et al. |
| 2009/0276190 | A1* | 11/2009 | Bell, Jr. ......... G01R 31/318357 703/1 |
| 2015/0010143 | A1 | 1/2015 | Yang |
| 2015/0379183 | A1 | 12/2015 | Odabasi et al. |
| 2016/0275288 | A1 | 9/2016 | Sethumadhavan et al. |
| 2017/0052895 | A1 | 2/2017 | Yang et al. |
| 2022/0044119 | A1* | 2/2022 | Wang ................... G06N 20/00 |

FOREIGN PATENT DOCUMENTS

| | | |
|---|---|---|
| CN | 109583562 A | 4/2019 |
| CN | 112435104 A | 3/2021 |
| WO | 2019196254 A1 | 10/2019 |
| WO | 2020149897 A1 | 7/2020 |
| WO | 2020259252 A1 | 12/2020 |

OTHER PUBLICATIONS

Ghaffarian et al.,"Neural software vulnerability analysis using rich intermediate graph representations of programs," Information Sciences 553 (2021), pp. 189-207. https://www.sciencedirect.com/science/article/pii/S0020025520311579 (Year: 2020).*

Wenisch et al. 2006 (T. F. Wenisch, R. E. Wunderlich, B. Falsafi and J. C. Hoe, "Statistical sampling of microarchitecture simulation," Proceedings 20th IEEE International Parallel & Distributed Processing Symposium, Rhodes, Greece, 2006, pp. 1-8., doi: 10.1109/IPDPS.2006.1639584) (Year: 2006).*

First Search for Chinese Application No. 202110499485.3 mailed on May 18, 2023.

First Office Action for Chinese Application No. 202111678200.9 mailed on Jan. 13, 2025.

* cited by examiner

METHOD AND SYSTEM FOR MICROARCHITECTURE-AWARE PROGRAM SAMPLING

TECHNICAL FIELD

The disclosure relates generally to program sampling. More specifically, this disclosure is related to a method and system for microarchitecture-aware program sampling based on multi-task learning.

BACKGROUND

The revolution of modern computing has been largely enabled by remarkable advances in computer systems and hardware. With the slowing of Moore's Law and Dennard scaling, the world is moving toward specialized hardware to meet the exponentially growing demand for computing. However, today's chips may take a great amount of time to design and perform qualification testing (e.g., functionality testing, performance testing). One of the hardware developers' pain points is the expensive cost of qualifying a new hardware configuration (or hardware design). For example, various performance benchmark programs may need to run to measure the performance of newly designed hardware. These benchmark programs are usually run on a simulator that simulates the newly designed hardware to measure different performance metrics. Since simulators are much slower (e.g., thousands of times slower) than actual hardware, running performance benchmark programs on a simulator may take a long time. This gives rise to program sampling, which samples sections of benchmark programs for running in order to reduce the workload of running entire performance benchmark programs on simulators. Hardware deployed in various scenarios often have different focuses. For example, some hardware focuses more on control flow and branch prediction; some hardware focuses more on memory behavior; some hardware focuses more on computation intensity. Conventional program-sampling techniques, such as random or rule-based program sampling, are microarchitecture-agnostic. The accuracy and reliability of hardware simulation based on conventional program-sampling techniques are limited by the lack of representation of relevant hardware microarchitecture information in the sampled programs.

SUMMARY

Various embodiments of the present specification may include systems, methods, and non-transitory computer-readable media for a novel microarchitecture-aware program sampling.

According to one aspect, a method for microarchitecture-aware program sampling may comprise: receiving one or more traces collected from one or more microarchitectures executing a computer program for evaluating hardware configurations; training a machine learning (ML) model with multi-task learning based on the one or more traces as one or more training tasks; generating a plurality of embedded vectors representing the computer program; and updating, based on the trained ML model, the plurality of embedded vectors.

In some embodiments, the method may further include sampling one or more embedded vectors from the plurality of updated embedded vectors, wherein the one or more sampled embedded vectors represent one or more sections of the computer program.

In some embodiments, the generating the plurality of embedded vectors representing the computer program is based on basic block vectorization (BBV) or deep neural network (DNN) embedding.

In some embodiments, the generating the plurality of embedded vectors representing the computer program comprises: compiling the computer program into intermediate code and executable code; obtaining an execution trace by executing the executable code on a runtime system; and generating a plurality of embedded vectors based on the intermediate code and the execution trace.

In some embodiments, the generating a plurality of vectors based on the intermediate code and the execution trace comprises: inputting the intermediate code into a graph neural network (GNN) to map the intermediate code into a graph; and generating the plurality of vectors based on the graph and the execution trace.

In some embodiments, the sampling one or more of the plurality of embedded vectors comprises: obtaining one or more clusters of embedded vectors by performing similarity searching on the plurality of embedded vectors; and sampling at least one embedded vectors from each of the one or more clusters.

In some embodiments, the one or more microarchitectures comprises at least one of the followings: server-class CPU, desktop-class CPU, mobile-class CPU, or Internet-of-Things (IoT) CPU.

In some embodiments, the ML model comprises an embedding layer for embedding information associated with execution pattern of each of the one or more microarchitectures into the plurality of embedded vectors.

In some embodiments, the ML model comprises one or more output layers respectively corresponding to the one or more microarchitectures.

In some embodiments, an output of the embedding layer is an input of the one or more output layers.

In some embodiments, the updating, based on the trained ML model, the plurality of embedded vectors comprises: inputting the plurality of embedded vectors into the trained ML model; and obtaining the plurality of updated embedded vectors as outputs from the embedding layer.

In some embodiments, each of the one or more traces comprises one or more performance measures for running the computer program on a corresponding microarchitecture.

In some embodiments, the one or more performance measures comprise at least one of the followings: cycles per instruction (CPI), cache miss rate, or branch misprediction rate.

In some embodiments, the computer program comprises a computer architecture benchmark program.

According to other embodiments, a system comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to another aspect, a system for microarchitecture-aware program sampling may include one or more processors and one or more non-transitory computer-readable memories coupled to the one or more processors, the one or more non-transitory computer-readable memories storing instructions that, when executed by the one or more processors, cause the system to perform operations comprising: receiving one or more traces collected from one or more microarchitectures executing a computer program for evaluating hardware configurations; training a machine learning (ML) model with multi-task learning based on the one or more traces as one or more training tasks; generating a plurality of embedded vectors representing the computer program; and updating, based on the trained ML model, the plurality of embedded vectors.

Embodiments disclosed in the specification have one or more technical effects. As mentioned in the background section, running entire benchmark programs on a simulator is often impractically slow. Existing solutions include random or rule-based program sampling to reduce the size of programs to run on the simulator. However, these solutions ignore the specific features associated with underlying microarchitectures, and thus are unable to accurately sample the sections of the programs that are most relevant to the microarchitectures being tested. In some embodiments described herein, a benchmark program may first be encoded into a plurality of vectors. This process takes into consideration microarchitecture-specific information of sample hardware such that the vectorized representation of the benchmark program allows such microarchitecture-specific information (e.g., execution environment or execution/performance pattern) to be embedded into the plurality of vectors. After embedding, the plurality of vectors may be sorted into a plurality of clusters based on similarity searching algorithms. The vectors within each cluster may correspond to different sections of the benchmark programs that are similar in light of the microarchitectures (hardware implementations of instruction sets). Then the program sampling may be performed based on the clusters by, for example, sampling one or more vectors from each cluster. The sampled vectors from the clusters may correspond to one or more sections of the benchmark program for measuring the performance metrics for the corresponding microarchitectures. By using this microarchitecture-aware program sampling, the sampled sections from the benchmark program is optimized to be representative and comprehensive for measuring the performance of the hardware configuration on the corresponding microarchitectures. In some embodiments, the microarchitecture-specific information may be embedded into a vectorized representation of a benchmark program based on a trained multi-task machine learning model. For example, a pipeline is designed to first obtain traces associated with one or more microarchitectures to which the hardware configuration may be deployed, and then train a multi-task machine learning model by using the traces as training tasks. The multi-task machine learning model may include an embedding layer (e.g., one or more convolution layers) and an output layer. An input (a vectorized representation of a benchmark program) to the multi-task machine learning model may go through the embedding layer where the information of the microarchitectures are embedded into the input. Subsequently, the output layer may classify the embedded input. The embedding results of the embedding layer may be used for the microarchitecture-aware program sampling. This pipeline allows the microarchitecture-specific information to be embedded into a vectorized representation of the benchmark program, which eventually enables the microarchitecture-aware program sampling.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, where like reference numerals designate corresponding parts in the various figures. It is to be expressly understood, however, that the drawings are for purposes of illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Figure 1:
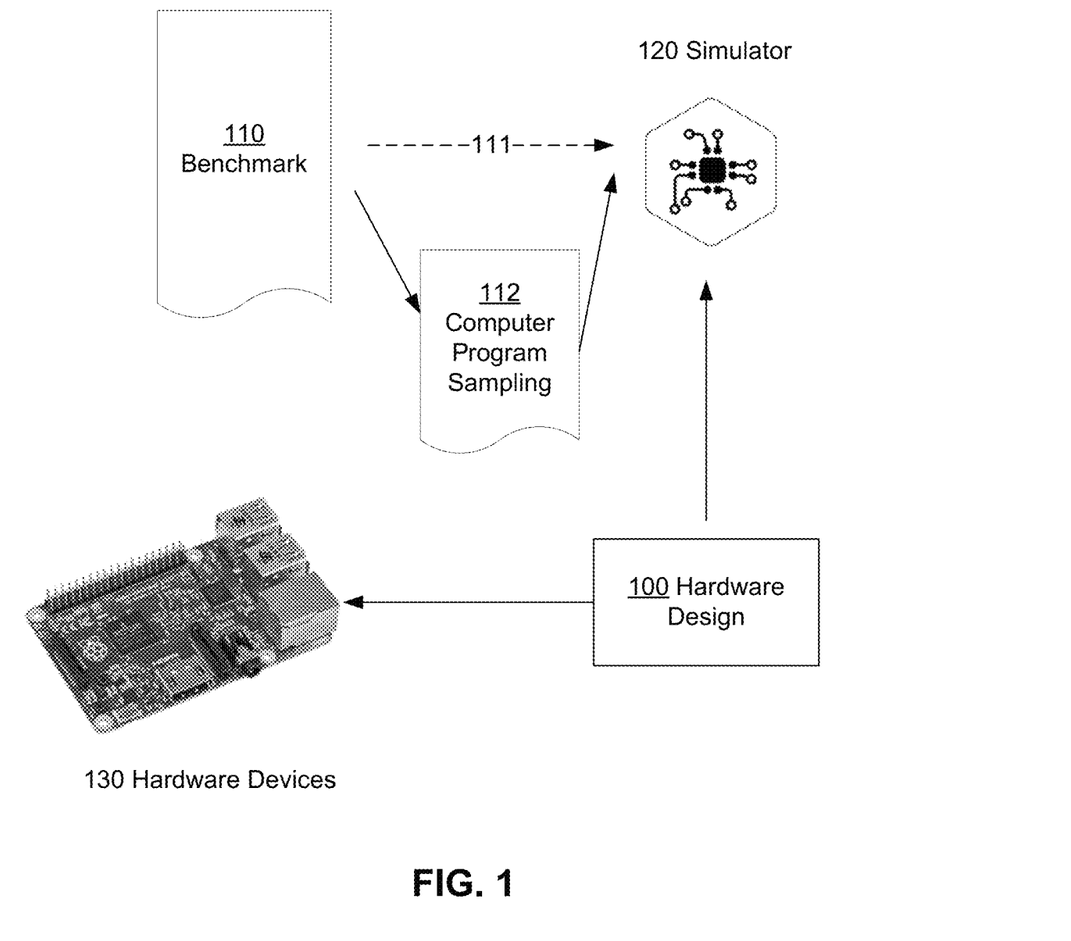
FIG. 1 illustrates exemplary environments in which microarchitecture-aware program sampling may be applied in accordance with some embodiments.

FIG. 1 illustrates an exemplary environment in which microarchitecture-aware program sampling may be applied in accordance with some embodiments. The environment illustrated in FIG. 1 involves running a benchmark program 110 for assessing the relative performance of a hardware configuration 100. As described in the background section, the benchmark program 110 usually runs on a simulator 120 that simulates the hardware configuration 100. The simulator 120 may be implemented on an on-premise computer system or a cloud-native hardware development platform (e.g., a cloud electronic design automation (EDA) platform). After the performance assessment is complete, the hardware configuration 100 may be deployed and implemented using physical hardware devices 130. The hardware devices 130 in FIG. 1 may include various types of microarchitectures.

A microarchitecture refers to a hardware implementation of an ISA (instruction set architecture). An ISA is a structure of commands and operations used by software to communicate with hardware. A microarchitecture is the hardware circuitry that implements one particular ISA. The same ISA (such as Intel Skylake CPUs ISA) may be implemented in various ways and thus may correspond to a class of microarchitectures. In the following description, CPU is used as an example for illustration purposes. The embodiments may also be applicable to other programmable processors such as graphics processing unit (GPU), Tensor Processing Unit (TPU), digital signal processor (DSP), or other hardware with ISA.

In some embodiments, standard benchmark programs such as Standard Performance Evaluation Corporation (SPEC) benchmarks are enormous (e.g., billions of instructions) and directly running entire benchmark programs on simulators 120 may be impractical (the dotted line 111 in FIG. 1). One way to solve this issue is to reduce the size of the benchmark programs for running on the simulator 120. Since a benchmark program 110 is usually designed to cover most, if not all, available hardware architectures (so that it becomes a standard benchmark), some sections of the benchmark program 110 may not be relevant to the hardware configuration 100 when it is to be deployed in one or more specific hardware architectures (the target microarchitectures).

In some embodiments, a computer program sampling 112 may be performed on the standard benchmark program 110 to sample some sections of the benchmark program 110 to run on the simulator. In order to accurately sample the sections that are most relevant to targeted microarchitectures, the computer program sampling 112 may be designed with microarchitecture-awareness. Since the benchmark program 110 itself does not possess microarchitecture information, the computer program sampling 112 process needs to find a way to embed the microarchitecture information into the benchmark program 110 and sample a representative subset of the embedded benchmark program 110 to be executed either in a simulation environment or a physical hardware environment.

In some embodiments, this computer program sampling 112 process may include: receiving one or more traces collected from one or more microarchitectures executing a computer program 110 for evaluating hardware configurations; training a machine learning (ML) model with multi-task learning based on the one or more traces as one or more training tasks; generating a plurality of embedded vectors representing the computer program 110; updating, based on the trained ML model, the plurality of embedded vectors; and sampling one or more embedded vectors from the plurality of updated embedded vectors, wherein the one or more sampled embedded vectors represent one or more sections of the computer program 110. In some embodiments, the ML model may be trained to embed an input and classify the embedded input corresponding to the one or more microarchitectures. In some embodiments, the process may further include extracting the one or more sections of the benchmark program 110 to run for the target microarchitectures.

Figure 2:
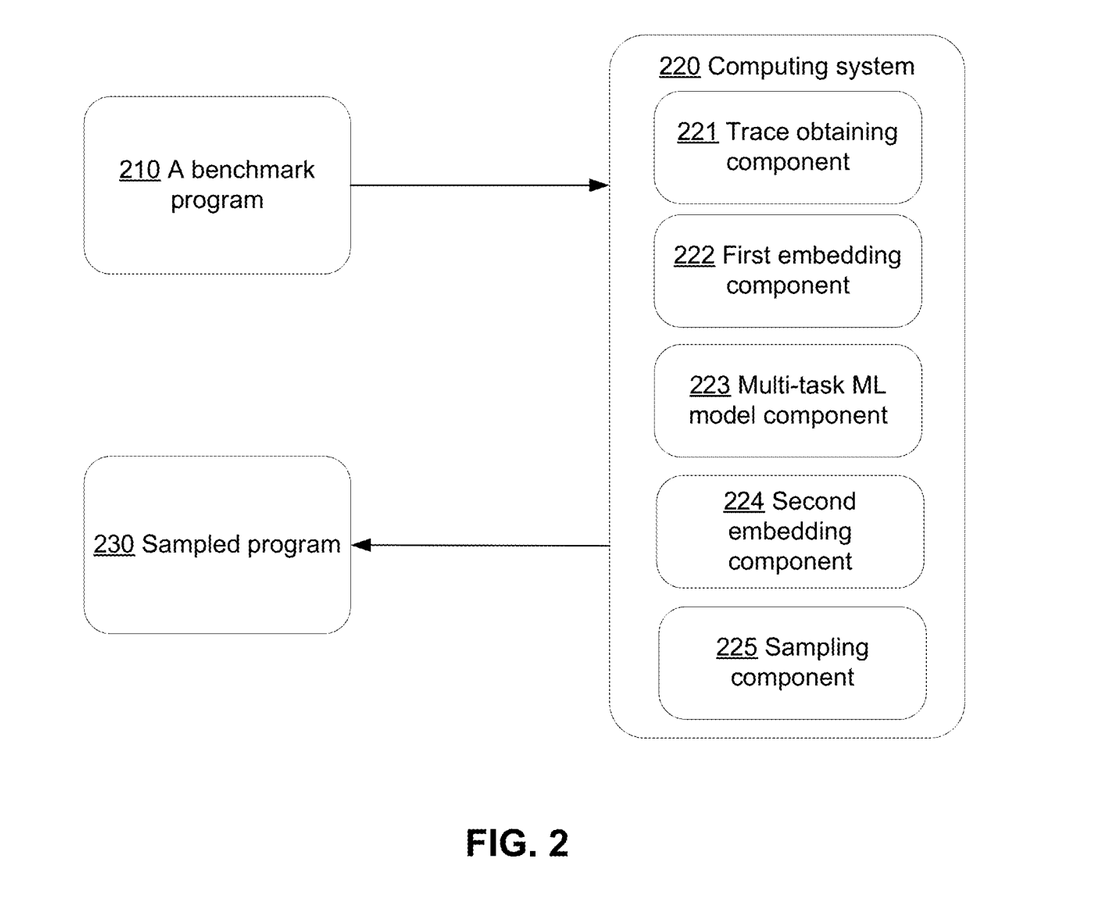
FIG. 2 illustrates an exemplary diagram of microarchitecture-aware program sampling in accordance with some embodiments.

FIG. 2 illustrates an exemplary diagram of microarchitecture-aware program sampling in accordance with some embodiments. The diagram in FIG. 2 includes a computing system 220 in which microarchitecture-aware program sampling may be implemented. As shown, the input to the computing system 220 may include a benchmark program 210 to be sampled. The benchmark program 210 may refer to a computer program or a set of operations for assessing various performance metrics of a hardware configuration, such as SPEC benchmarks for evaluating the performance of computer systems. The output of the computing system 220 may include sampled programs 230 from the benchmark program 210. In some cases, a benchmark program 210 may include millions or even billions of lines of instructions.

After the microarchitecture-aware program sampling performed by the computing system 220, some sections of the benchmark program 210 may be sampled to provide the instructions that are most relevant to the hardware configuration. These sampled sections may run on a simulator or an actual hardware device to evaluate the hardware configuration. For example, a standard benchmark program 210 may be designed to evaluate all microarchitectures available in the market, but the hardware configuration may only target a few of the microarchitectures. In this case, running the entire standard benchmark program 210 is not only time-consuming but also unnecessary. By selecting the sections (e.g., instruction sections) of the standard benchmark program 210 to run, the cost of evaluating the hardware configuration may be significantly reduced.

However, it is challenging to identify the sections of the benchmark program 210 that are most representative of the entire benchmark program 210 for a given hardware configuration. One of the reasons is that the benchmark program 210 itself is microarchitecture-agnostic. To tackle this challenge, the computing system 220 in FIG. 2 is proposed to implement microarchitecture-aware program sampling.

In some embodiments, the computing system 220 may include a trace obtaining component 221, a first embedding component 222, a multi-task machine learning (ML) model component 223, a second embedding component 224, and a sampling component 225. These components are for illustrative purposes only. Depending on the implementation, the computing system 220 may include more, fewer, or alternative components. In some embodiments, some or all of the components of the computing system 220 may be implemented in a cloud-native hardware development platform, such as a cloud EDA platform.

In some embodiments, the trace obtaining component 221 may be configured to receive one or more traces collected from one or more microarchitectures. The traces may be collected by running the benchmark program 210 on the microarchitectures. The traces may include one or more performance measurements for running the benchmark program 210 on the microarchitectures, such as cycles per instruction (CPI), cache miss rate, branch misprediction rate, other suitable performance measures, or any combination thereof. For example, each trace may be collected by running the benchmark program 210 on a class of microarchitectures implementing the same ISA. The trace may include multiple performance measurements, such as CPI, miss per kilo-instructions (MPKI). Each of the performance measurements may be associated with multiple labels, and each of the multiple labels may correspond to one performance measurement collected from one particular microarchitecture. As another example, assuming the benchmark program 210 has one billion lines of instructions, for every million lines of instructions running on a first microarchitecture, execution traces may be collected. Each execution trace for the first microarchitecture may include a plurality of CPI information, each CPI corresponding to a million lines of instructions that have run on the first microarchitecture. Further assuming that there are multiple target microarchitectures to be evaluated, each microarchitecture may have a trace file with performance measurements. These performance measurements may contain execution patterns or other inherent unique information of corresponding microarchitectures and thus may be used to represent these microarchitectures.

In some embodiments, the one or more traces may be collected off the cloud by hardware developers running the benchmark program 210 on the (physical) microarchitectures. While in other embodiments, the one or more traces may be collected by the computing system 220 running the benchmark program 210 on the (physical) microarchitectures. For example, if the computing system 220 is implemented as a cloud-native hardware development platform, it may have access to the target microarchitectures and run the corresponding benchmark on these target microarchitectures to collect traces. In some embodiments, the computing system 220 may prepare the traces for various microarchitectures and standard (or other frequently used) benchmarks beforehand, and store these traces for future use.

In some embodiments, the first embedding component 222 may be configured to generate a plurality of vectors representing the benchmark program 210. The plurality of vectors may also be called embedding vectors of the benchmark program 210. In some embodiments, the vectorized representation may be generated based on basic block vectorization (BBV) or based on DNN embedding. For example, the plurality of vectors may be generated by compiling the computer program into intermediate code and executable code; running the executable code on a runtime system to collect a trace; and generating a plurality of vectors based on the intermediate code and the trace to represent code execution states of the computer program. In some embodiments, the generating a plurality of vectors based on the intermediate code and the trace includes: inputting the intermediate code into a graph neural network (GNN) to map the intermediate code into a graph; and generating the plurality of vectors based on the graph and the trace.

In some embodiments, the multi-task ML model component 223 may be configured to train a machine learning model based on the traces obtained by the trace obtaining component 221 using multi-task learning. During the learning, the traces are used as the training tasks for training the model. Each of the traces/training tasks may include a plurality of performance measurements (such as CPI, MPKI, branch-miss-rate) collected on a class of CPU microarchitectures. Each of the performance measurements may be associated with multiple labels with each label corresponding to a particular microarchitecture. In some embodiments, the number of labels in each trace (training task) may be the product of the number of performance measurements and the number of microarchitectures. The labels may be designed to hide the information about the microarchitectures from which the traces were collected (e.g., for privacy concern). Multi-task learning is a subfield of machine learning in which multiple learning tasks are solved at the same time, while exploiting commonalities and differences across tasks. Using multi-task learning may improve learning efficiency and prediction accuracy for the task-specific models when compared to training the models separately. In some embodiments, the multi-task ML model may be trained to embed the information (such as execution patterns, CPI patterns) of the microarchitectures in various forms. In order to do so, the multi-task ML model may include an embedding layer (e.g., one or more convolution layers) and one output layer. The embedding layer may embed inherent information/features of the microarchitectures (implied in the training tasks) into the input, which may be fed into the output layer for final classification. In some embodiments, the embedding layer may be shared among the tasks, while the output layer may include one or more branches corresponding to the tasks.

In some embodiments, the second embedding component 224 may be configured to update the vectorized representation of the benchmark program 210 generated from the first embedding component 222. This "update" step may include injecting the feature information of the target microarchitectures into the vectors so that the final sampling on these vectors is microarchitecture-aware. The feature information may include environment information, execution pattern, performance measurement pattern, or other suitable information. In some embodiments, the second embedding component 224 may use the embedding layer of the multi-task ML model trained by the multi-task ML model component 223 to perform the "update" step. As described above, the embedding layer of the multi-task ML model embeds the information of the traces into the input. When the input is the vectorized representation of the benchmark program 210, and the tasks include the traces of running the benchmark program 210 on the target microarchitectures, the embedding layer of the multi-task ML model may embed the information of the target microarchitectures into the vectorized representation of the benchmark program 210. In some embodiments, embedding the information of a target microarchitecture may include adjusting the vectorized representation of the benchmark program 210 so that weights or values relevant to the target microarchitecture are increased and the weights or values irrelevant to the target microarchitecture are decreased.

In some embodiments, the sampling component 225 may be configured to sample one or more of the plurality of embedded vectors representing one or more sections of the benchmark program 210. The purpose of this sampling step is to select from benchmark program 210 the instructions that are most representative of the benchmark program 210 in light of the target microarchitectures. In some embodiments, this sampling step includes performing similarity searching operations on the plurality of embedded vectors to obtain one or more clusters of embedded vectors; and sampling one or more embedded vectors from each of the one or more clusters. The similarity search operations may cluster similar vectors, which represent similar sections of the benchmark program 210. Here, the "similar sections of the benchmark program 210" may refer to the seconds of instructions designed to test the same/similar microarchitecture or to make the same/similar performance measurement. Therefore, in order to reduce the number of instructions to run while keeping a similar testing coverage, only one or more (but not all) of the similar sections of the benchmark program 210 can be sampled to represent all of the similar sections.

Figure 3:
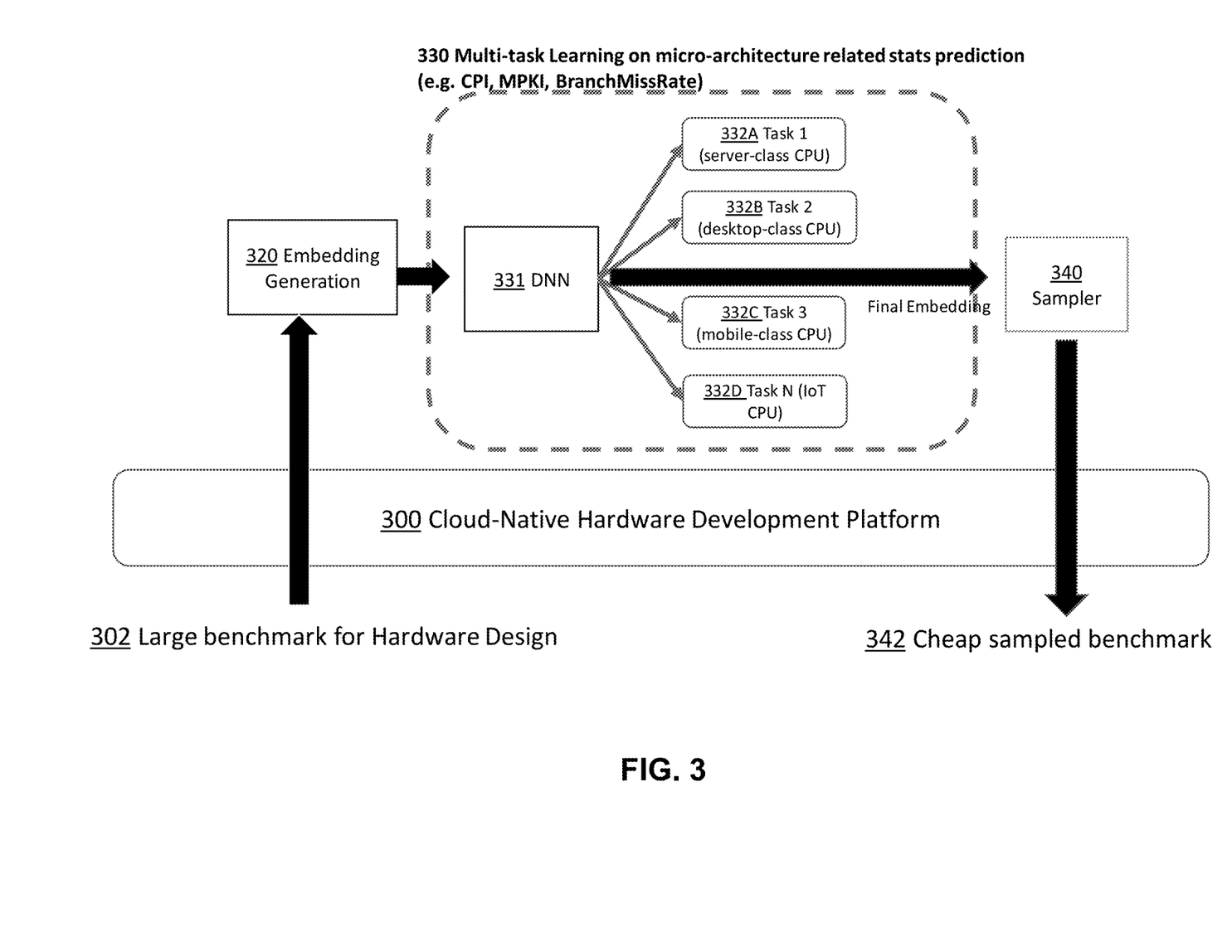
FIG. 3 illustrates an exemplary workflow for microarchitecture-aware program sampling in accordance with some embodiments.

FIG. 3 illustrates an exemplary workflow for microarchitecture-aware program sampling in accordance with some embodiments. As shown, the exemplary microarchitecture-aware program sampling is implemented as a pipeline on a cloud-native hardware development platform 300. Hardware developers may communicate with the cloud-native hardware development platform 300 (referred to as a cloud platform) by providing a large benchmark 302 for evaluating a hardware configuration, and obtaining back a cheap sampled benchmark 342 (e.g., a subset of the large benchmark 302). The hardware developers may run the cheap sampled benchmark 342 to achieve a similar evaluation coverage with much less cost (e.g., time, computation, storage). Depending on the implementation, some of the functionalities in the illustrated pipeline may be moved out to the hardware developer side. For example, the embedding generation component 320 for generating vectors representing the computer program may be implemented either on the cloud or locally.

In some embodiments, the large benchmark 302 may be uploaded to the cloud platform 300 for an initial embedding generation 320. The embedding generation 320 may generate a plurality of vectors to represent the large benchmark 302 in various ways, such as using traditional BBV or a neural network. In some embodiments, the embedding generation 320 may include compiling the large benchmark 302 into intermediate code and executable code; running the executable code on a runtime system to collect a trace; and generating a plurality of vectors based on the intermediate code and the trace to represent code execution states of the large benchmark 302. In some embodiments, the generating of a plurality of vectors based on the intermediate code and the trace include inputting the intermediate code into a graph neural network (GNN) to map the intermediate code into a graph; and generating the plurality of vectors based on the graph and the trace. GNNs are connectionist models that capture the dependencies via message passing between the nodes of graphs. In some embodiments, the plurality of vectors may be input into a Sequence Model (e.g., a neural network) to generate a fixed-length vector to represent the large benchmark.

As explained above, the large benchmark 302 (also called a computer program, or a benchmark program) for testing hardware configurations is usually microarchitecture-agnostic. However, the number of target microarchitectures onto which a given hardware configuration may be deployed is usually small. For example, a hardware configuration may be deployed onto architectures with server-class CPUs and desktop-class CPUs but not mobile-class CPUs and Internet-of-Things (IoT) CPUs, which have different resources and performance requirements. Therefore, after receiving the expensive workload 302, the pipeline may need to obtain feature information of the target microarchitectures for performing microarchitecture-aware sampling on the expensive workload 302. This may be achieved by training a multi-task learning model 330 for micro-architecture related stats prediction. Exemplary stats include CPI, MPKI, branch missing rate, etc.

In some embodiments, a plurality of traces may be collected from the target microarchitectures and used as training tasks (corresponding to the microarchitectures) for training the multi-task learning model 330. These traces may be obtained in various ways. For example, the hardware developers may collect such traces and upload them to the cloud platform 300. As another example, the cloud platform 300 may prepare such traces for popular microarchitectures beforehand. In some embodiments, each of the traces includes one or more performance measures for running a section of the expensive workload 302 on a corresponding microarchitecture. The performance measures include at least one of the following: cycles per instruction (CPI), cache miss rate, or branch misprediction rate. For example, if a hardware configuration may be deployed onto four types of CPUs including server-class CPU 332A, desktop-class CPU 332B, mobile-class CPU 332C, and IoT-class CPU 332D, a CPI trace may be obtained for each of the four types of CPU. The four traces may be used as four tasks for training the multi-task learning model 330. The four traces may be labeled for training purposes. Each of the four traces may include a plurality of performance measurements (such as CPI, MPKI) collected from one or more CPU microarchitectures (such as CPU-A, CPU-B) from the same CPU class. Each of the performance measurements may be associated with one or more labels corresponding to the one or more CPU microarchitectures (such as CPI of CPU-A, CPI of CPU-B). In this example, the total number of labels to train may be determined as a product of the number of performance measurements and the number of CPU architectures from the same CPU class. In some embodiments, each label may be a hash value, an index, or another suitable value. For privacy concerns, the labels may be designed to hide which microarchitectures they refer to. For example, when testing a new hardware configuration on a cloud-native platform, the developers may concern about revealing to the cloud or other cloud users which target microarchitectures the new design will be deployed to. In this case, the identifiers may be hash values generated based on the microarchitectures. The number of traces is not limited by what's shown on FIG. 3. As shown therein, there may be N tasks corresponding to a plurality of microarchitectures, where N may be any suitable number.

In some embodiments, the multi-task learning model 330 may be implemented as a deep neural network (DNN) 331. The DNN 331 may include an embedding layer for embedding the input of the multi-task learning model 330 and one or more output layers respectively corresponding to the one or more microarchitectures 332A-332D. In some embodiments, the DNN 331 may include one output layer with one or more outlets corresponding to the one or more microarchitectures 332A-332D. In some embodiments, the embedding layer may be shared among the plurality of microarchitectures and include one or more convolution layers. The output of the embedding layer of the DNN 331 may inject the features of the microarchitectures 332A-332D into an input vector. For example, if the vector representing the large benchmark is input into the DNN 331, the embedding layer may adjust the parameters of the vector by enhancing (increasing the value of) important dimensions and weakening (decreasing the value of) non-important dimensions in the vector.

In some embodiments, the vector updated through the embedding layer (by injecting the features of the microarchitectures 332A-332D) may be referred to as the final embedding of the large benchmark 302. This final embedding may include a plurality of embedded vectors corresponding to a plurality of sections of the large benchmark 302. In some embodiments, this final embedding may be the basis for microarchitecture-aware program sampling. For example, one or more of the plurality of embedded vectors may be sampled by performing similarity searching operations on the plurality of embedded vectors to obtain one or more clusters of embedded vectors; and sampling one or more embedded vectors from each of the one or more clusters. The similarity searching operations may be implemented using K-means, locality sensitive hashing, K-nearest neighbors, or other suitable algorithms. The sections of the large benchmark 302 corresponding to the one or more sampled embedded vectors may be sampled to represent the entire large benchmark 302 for evaluating the hardware configuration targeting the microarchitectures 332A-332D.

Figure 4:
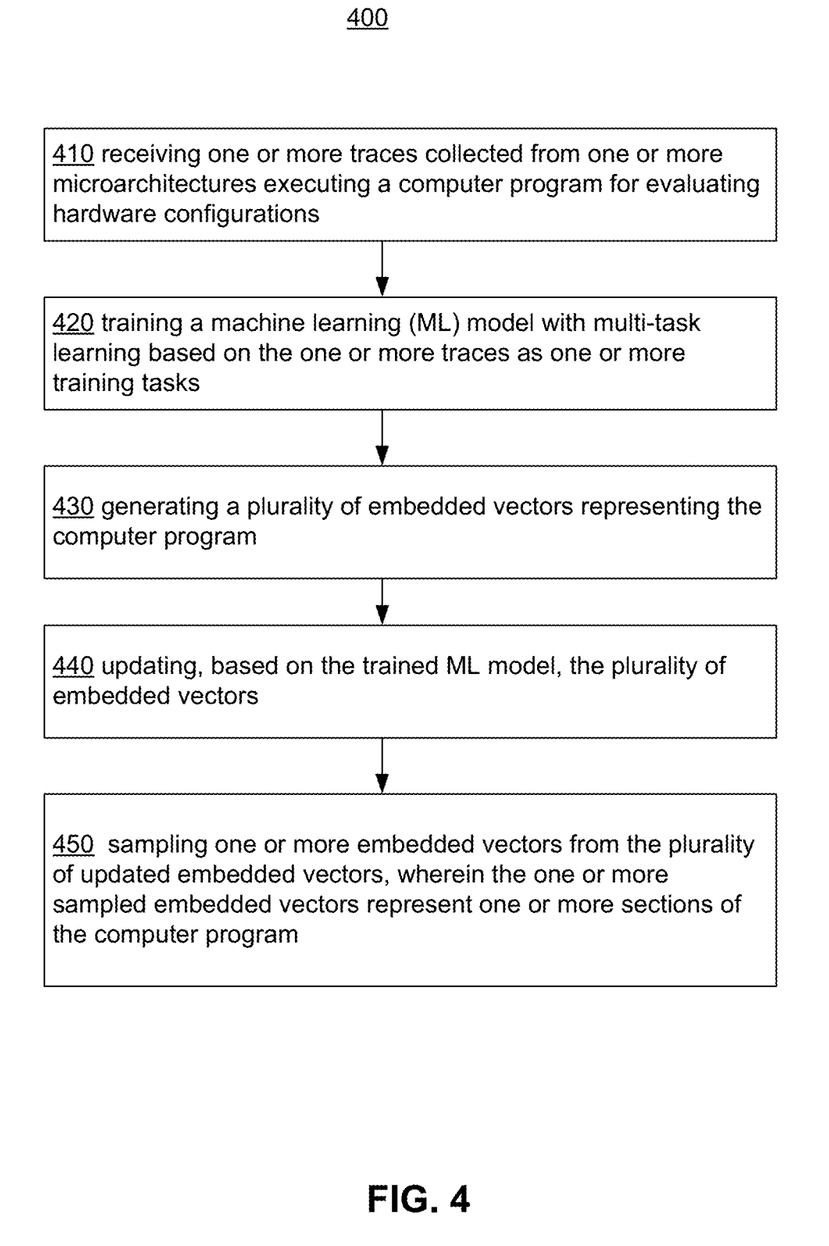
FIG. 4 illustrates an exemplary method of microarchitecture-aware program sampling in accordance with some embodiments.

FIG. 4 illustrates an exemplary method 400 for microarchitecture aware program sampling in accordance with various embodiments. The method 400 may be implemented in an environment shown in FIG. 1. The method 400 may be performed by a device, apparatus, or system illustrated by FIGS. 1-3. Depending on the implementation, the method 400 may include additional, fewer, or alternative steps performed in various orders or parallel.

Block 410 includes receiving one or more traces collected from one or more microarchitectures executing a computer program for evaluating hardware configurations. In some embodiments, the one or more microarchitectures comprises at least one of the followings: server-class CPU, desktop-class CPU, mobile-class CPU, or Internet-of-Things (IoT) CPU. In some embodiments, each of the one or more traces comprises one or more performance measures for running the computer program on a corresponding microarchitecture. In some embodiments, the one or more performance measures comprise at least one of the followings: cycles per instruction (CPI), cache miss rate, or branch misprediction rate. In some embodiments, the computer program comprises a computer architecture benchmark program.

Block 420 includes training a machine learning (ML) model with multi-task learning based on the one or more traces as one or more training tasks. In some embodiments, the ML model comprises an embedding layer for embedding information associated with execution pattern of each of the one or more microarchitectures into the plurality of embedded vectors. In some embodiments, the ML model comprises one or more output layers respectively corresponding to the one or more microarchitectures. In some embodiments, an output of the embedding layer is an input of the one or more output layers.

Block 430 includes generating a plurality of embedded vectors representing the computer program. In some embodiments, the generating the plurality of embedded vectors representing the computer program is based on basic block vectorization (BBV) or deep neural network (DNN) embedding. In some embodiments, the generating the plurality of embedded vectors representing the computer program comprises: compiling the computer program into intermediate code and executable code; obtaining an execution trace by executing the executable code on a runtime system; and generating a plurality of embedded vectors based on the intermediate code and the execution trace. In some embodiments, the generating a plurality of vectors based on the intermediate code and the execution trace comprises: inputting the intermediate code into a graph neural network (GNN) to map the intermediate code into a graph; and generating the plurality of vectors based on the graph and the execution trace.

Block 440 includes updating, based on the trained ML model, the plurality of embedded vectors. In some embodiments, the updating, based on the trained ML model, the plurality of embedded vectors comprises: inputting the plurality of embedded vectors into the trained ML model; and obtaining the plurality of updated embedded vectors as outputs from the embedding layer.

Block 450 includes sampling one or more embedded vectors from the plurality of updated embedded vectors, wherein the one or more sampled embedded vectors represent one or more sections of the computer program. In some embodiments, the sampling one or more of the plurality of embedded vectors comprises: obtaining one or more clusters of embedded vectors by performing similarity searching on the plurality of embedded vectors; and sampling at least one embedded vectors from each of the one or more clusters.

Figure 5:
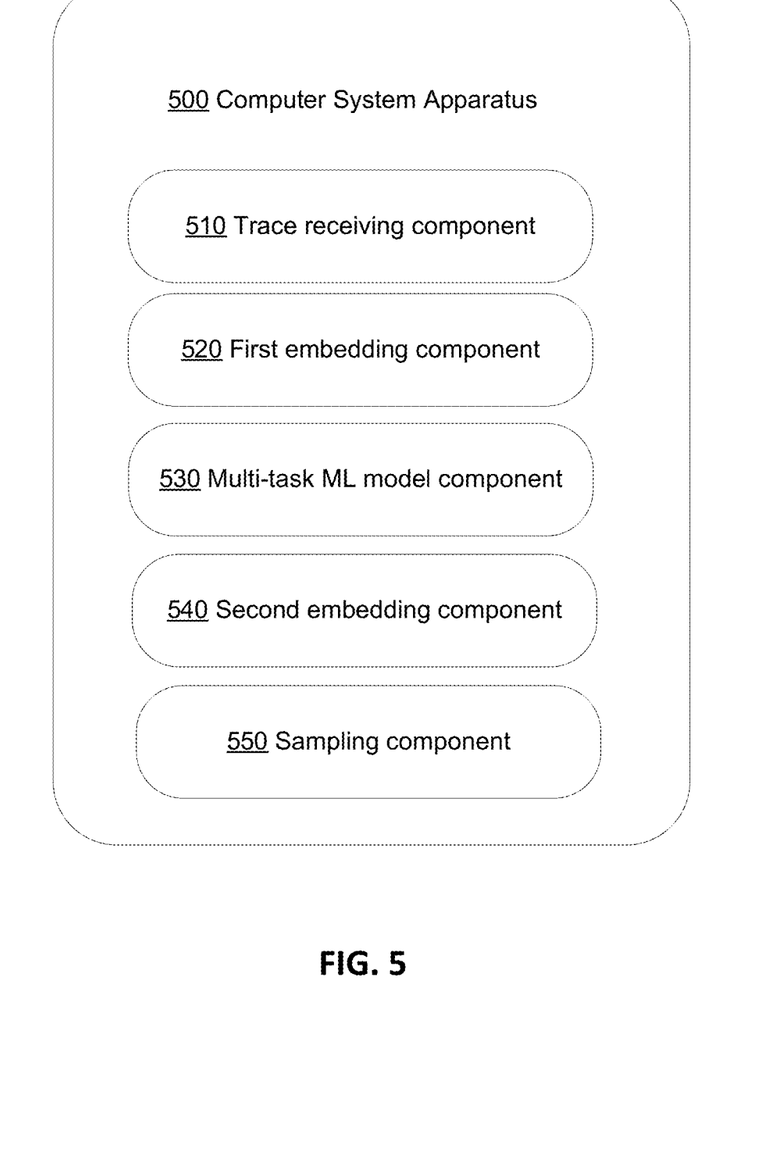
FIG. 5 illustrates a block diagram of a computer system apparatus for microarchitecture-aware program sampling in accordance with some embodiments.

FIG. 5 illustrates a block diagram of a computer system apparatus 500 for microarchitecture-aware program sampling in accordance with some embodiments. The components of the computer system apparatus 500 presented below are intended to be illustrative. Depending on the implementation, the computer system apparatus 500 may include additional, fewer, or alternative components.

The computer system apparatus 500 may be an example of an implementation of the method of FIG. 4. The computer system apparatus 500 may include one or more processors and one or more non-transitory computer-readable storage media (e.g., one or more memories) coupled to the one or more processors and configured with instructions executable by the one or more processors to cause the system or device (e.g., the processor) to perform the above-described embodiments. The computer system apparatus 500 may include various units/modules corresponding to the instructions (e.g., software instructions).

In some embodiments, the computer system apparatus 500 may be referred to as an apparatus for microarchitecture-aware program sampling. The apparatus 500 may include a trace receiving component 510, a first embedding component 520, a multi-task machine learning (ML) model component 530, a second embedding component 540, and a sampling component 550. In some embodiments, the trace receiving component 510 may be configured to receive one or more traces collected from one or more microarchitectures executing a computer program for evaluating hardware configuration. In some embodiments, the first embedding component 520 may be configured to generate plurality of embedded vectors representing the computer program. In some embodiments, the multi-task machine learning (ML) model component 530 may be configured to train a machine learning (ML) model with multi-task learning based on the one or more traces as one or more training tasks. In some embodiments, the second embedding component 540 may be configured to update the plurality of embedded vectors based on the trained ML model. In some embodiments, the sampling component 550 may be configured to sample one or more embedded vectors from the plurality of updated embedded vectors, wherein the one or more sampled embedded vectors represent one or more sections of the computer program.

Figure 6:
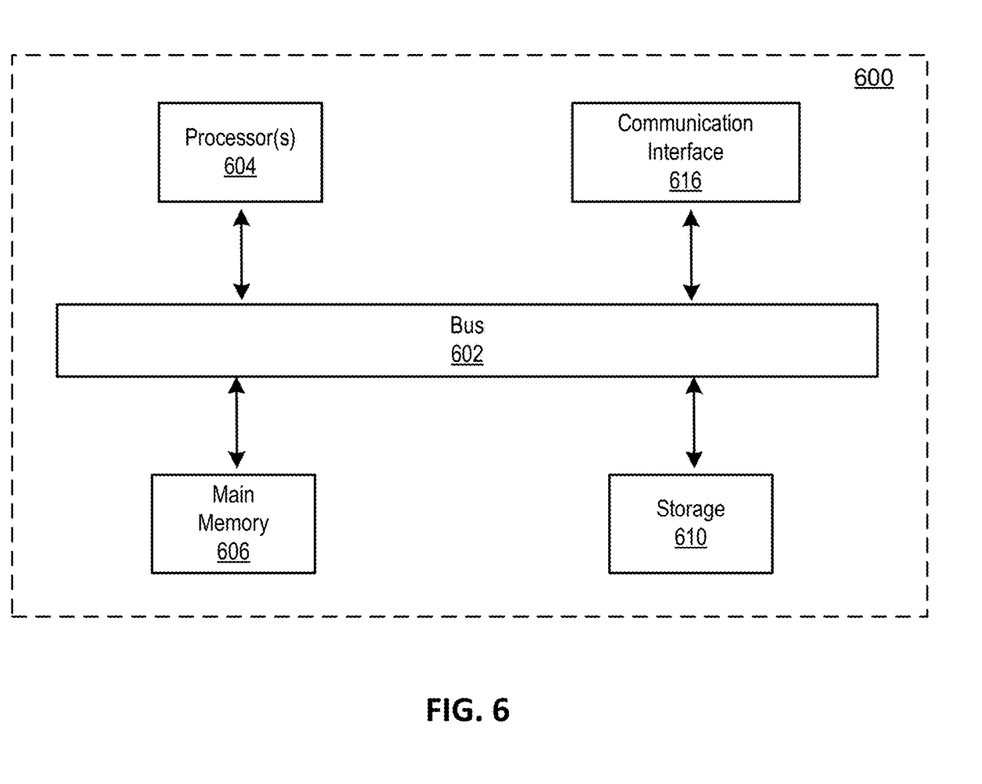
FIG. 6 illustrates an exemplary block diagram of a computer system in which any of the embodiments described herein may be implemented.

FIG. 6 illustrates an exemplary block diagram of a computer system in which any of the embodiments described herein may be implemented. The computing device may be used to implement one or more components of the systems and the methods shown in FIGS. 1-5. The computing device 600 may comprise a bus 602 or other communication mechanisms for communicating information and one or more hardware processors 604 coupled with bus 602 for processing information. Hardware processor(s) 604 may be, for example, one or more general-purpose microprocessors.

The computing device 600 may also include a main memory 606, such as random-access memory (RAM), cache and/or other dynamic storage devices 610, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, may render computing device 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 600 may implement the techniques described herein using customized hard-wired logic, one or more ASICs or FPGAs, firmware and/or program logic which in combination with the computing device may cause or program computing device 600 to be a special-purpose machine. According to one embodiment, the techniques herein are performed by computing device 600 in response to processor(s) 604 executing one or more sequences of one or more instructions contained in main memory 606. Such instructions may be read into main memory 606 from another storage medium, such as storage device 610. Execution of the sequences of instructions contained in main memory 606 may cause the processor(s) 604 to perform the process steps described herein. For example, the processes/methods disclosed herein may be implemented by computer program instructions stored in main memory 606. When these instructions are executed by processor(s) 604, they may perform the steps as shown in corresponding figures and described above. In alternative embodiments, hard-wired circuitry may be used in place of or in combination with software instructions.

The computing device 600 also includes a communication interface 616 coupled to bus 602. Communication interface 616 may provide a two-way data communication coupling to one or more network links that are connected to one or more networks. As another example, communication interface 616 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for sampling sections of a computer program to evaluate a hardware configuration to be deployed onto a plurality of variant microarchitectures, comprising:

obtaining a plurality of traces collected from executing the computer program on the plurality of variant microarchitectures, wherein the computer program comprises a benchmark program, and each of the plurality of traces includes a plurality of performance measurements associated with one or more labels corresponding to the plurality of variant microarchitectures;

training a machine learning (ML) model with multi-task learning based on the plurality of traces and the one or more labels as one or more training tasks, wherein the ML model comprises an embedding layer trained for embedding microarchitecture-specific features of the plurality of variant microarchitectures into vector representations of the plurality of traces;

compiling the computer program into intermediate code and executable code;

obtaining an execution trace by executing the executable code on a runtime system;

inputting the intermediate code into a graph neural network (GNN) to map the intermediate code into a graph;

generating a plurality of embedded vectors based on (1) the graph and (2) the execution trace, the plurality of embedded vectors corresponding to a plurality of sections of the computer program, wherein the computer program and the plurality of embedded vectors are microarchitecture-agnostic; and updating, using the embedding layer of the trained ML model, the plurality of embedded vectors by injecting the microarchitecture-specific features of the runtime system into the plurality of embedded vectors as a basis for performing microarchitecture-aware program sampling on the computer program;

sampling the plurality of updated embedded vectors to identify a plurality of sections of the computer program that are corresponding to the plurality of variant microarchitectures; and returning an indication of the plurality of sections of the computer program to evaluate the hardware configuration to be deployed onto the plurality of variant microarchitectures.

2. The method of claim 1, wherein the sampling comprises:
obtaining one or more clusters of embedded vectors by performing similarity searching on the plurality of updated embedded vectors; and
sampling at least one updated embedded vectors from each of the one or more clusters.

3. The method of claim 1, wherein the generating the plurality of embedded vectors representing the computer program is based on basic block vectorization (BBV) or deep neural network (DNN) embedding.

4. The method of claim 1, wherein the plurality of variant microarchitectures comprises at least one of the followings: server-class CPU, desktop-class CPU, mobile-class CPU, or Internet-of-Things (IoT) CPU.

5. The method of claim 1, wherein the ML model comprises one or more output layers respectively corresponding to the plurality of variant microarchitectures.

6. The method of claim 5, wherein an output of the embedding layer is an input of the one or more output layers.

7. The method of claim 1, wherein the updating, based on the trained ML model, the plurality of embedded vectors comprises:
inputting the plurality of embedded vectors into the trained ML model; and
obtaining the plurality of updated embedded vectors as outputs from the embedding layer.

8. The method of claim 1, wherein each of the one or more traces comprises one or more performance measures for running the computer program on a corresponding microarchitecture.

9. The method of claim 8, wherein the one or more performance measures comprise at least one of the followings: cycles per instruction (CPI), cache miss rate, or branch misprediction rate.

10. A system for sampling sections of a computer program to evaluate a hardware configuration to be deployed onto a plurality of variant microarchitectures, the system comprising one or more processors and one or more non-transitory computer-readable memories coupled to the one or more processors, the one or more non-transitory computer-readable memories storing instructions that, when executed by the one or more processors, cause the system to perform operations comprising:
obtaining a plurality of traces collected from executing the computer program on the plurality of variant microarchitectures, wherein the computer program comprises a benchmark program, and each of the plurality of traces includes a plurality of performance measurements associated with one or more labels corresponding to the plurality of variant microarchitectures;
training a machine learning (ML) model with multi-task learning based on the plurality of traces and the one or more labels as one or more training tasks, wherein the ML model comprises an embedding layer trained for embedding microarchitecture-specific features of the plurality of variant microarchitectures into vector representations of the plurality of traces;
compiling the computer program into intermediate code and executable code;
obtaining an execution trace by executing the executable code on a runtime system;
inputting the intermediate code into a graph neural network (GNN) to map the intermediate code into a graph;
generating a plurality of embedded vectors based on (1) the graph and (2) the execution trace, the plurality of embedded vectors corresponding to a plurality of sections of the computer program, wherein the computer program and the plurality of embedded vectors are microarchitecture-agnostic; and
updating, using the embedding layer of the trained ML model, the plurality of embedded vectors by injecting the microarchitecture-specific features of the runtime system into the plurality of embedded vectors as a basis for performing microarchitecture-aware program sampling on the computer program;
sampling the plurality of updated embedded vectors to identify a plurality of sections of the computer program that are corresponding to the plurality of variant microarchitectures; and
returning an indication of the plurality of sections of the computer program to evaluate the hardware configuration to be deployed onto the plurality of variant microarchitectures.

11. The system of claim 10, wherein the sampling comprises:
obtaining one or more clusters of embedded vectors by performing similarity searching on the plurality of updated embedded vectors; and
sampling at least one updated embedded vectors from each of the one or more clusters.

12. A non-transitory computer-readable storage medium for sampling sections of a computer program to evaluate a hardware configuration to be deployed onto a plurality of variant microarchitectures, the storage medium configured with instructions executable by one or more processors to cause the one or more processors to perform operations comprising:
obtaining a plurality of traces collected from executing the computer program on the plurality of variant microarchitectures, wherein the computer program comprises a benchmark program, and each of the plurality of traces includes a plurality of performance measurements associated with one or more labels corresponding to the plurality of variant microarchitectures;
training a machine learning (ML) model with multi-task learning based on the plurality of traces as one or more training tasks, wherein the ML model comprises an embedding layer trained for embedding microarchitecture-specific features of the plurality of variant microarchitectures into vector representations of the plurality of traces;
compiling the computer program into intermediate code and executable code;
obtaining an execution trace by executing the executable code on a runtime system;
inputting the intermediate code into a graph neural network (GNN) to map the intermediate code into a graph;
generating a plurality of embedded vectors based on (1) the graph and (2) the execution trace, the plurality of embedded vectors corresponding to a plurality of sections of the computer program, wherein the computer program and the plurality of embedded vectors are microarchitecture-agnostic; and
updating, using the embedding layer of the trained ML model, the plurality of embedded vectors by injecting the microarchitecture-specific features of the runtime system into the plurality of embedded vectors as a basis for performing microarchitecture-aware program sampling on the computer program;

sampling the plurality of updated embedded vectors to identify a plurality of sections of the computer program that are corresponding to the plurality of variant microarchitectures; and returning an indication of the plurality of sections of the computer program to evaluate the hardware configuration to be deployed onto the plurality of variant microarchitectures.

* * * * *